Jan. 22, 1963  L. KIRKEL  3,074,752
SHOVEL WITH PIVOTALLY ADJUSTABLE HEAD
Filed Nov. 27, 1959
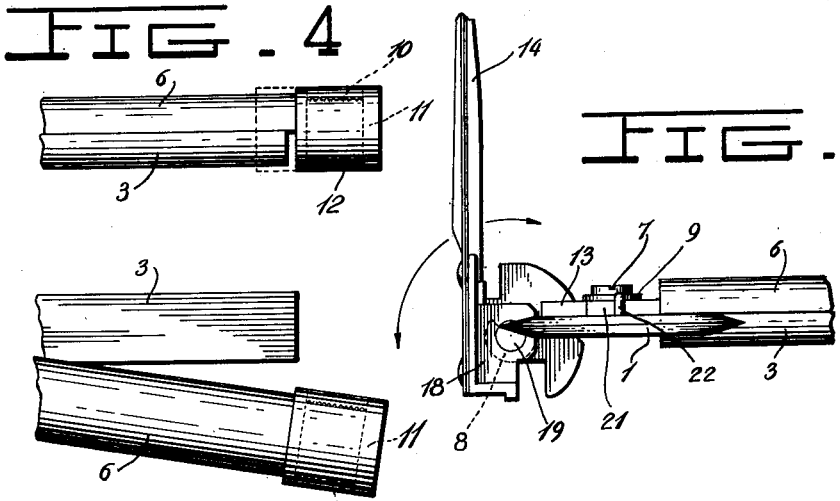
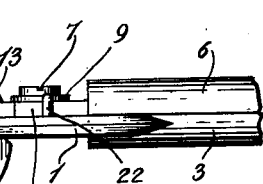
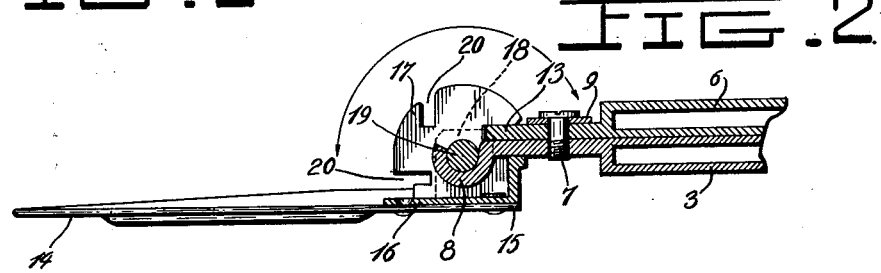
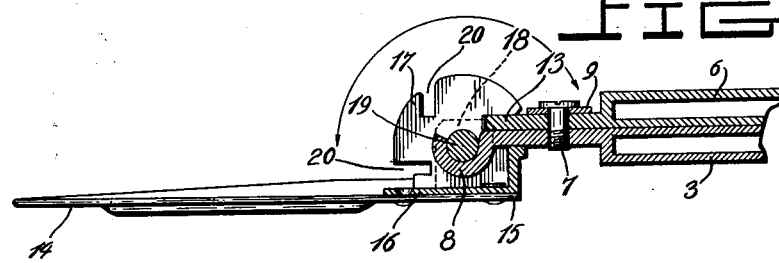
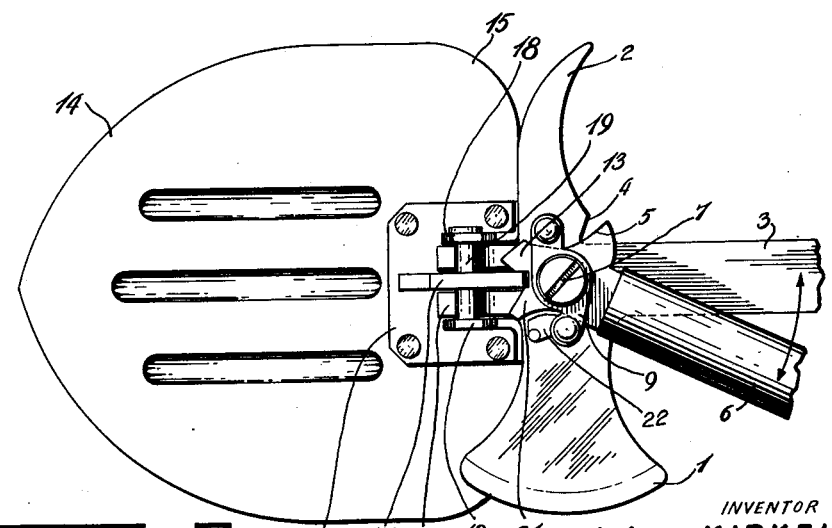
INVENTOR
Léo KIRKEL
BY
ATTORNEYS

United States Patent Office 3,074,752
Patented Jan. 22, 1963

3,074,752
SHOVEL WITH PIVOTALLY ADJUSTABLE HEAD
Leo Kirkel, 77 Rue des Plantes, Paris, France
Filed Nov. 27, 1959, Ser. No. 855,609
3 Claims. (Cl. 294—53.5)

This invention relates to improvements in portable tools and has for one of its principal objects to provide assembled elements capable of assuming different relative positions according to use. It includes primarily a shovel and a handle which may assume, with reference to the shovel, various inclinations, so that the tool may be used, as desired, as a hoe or a spade and means for engaging and locking the handle on the shovel. Said means may be constituted by a handle including two elements pivotally secured together so that it is possible to form therewith shears, of which one jaw is rigid with an axe and with a pick.

It is an object of the invention to provide means for assembling and securing the component parts and allowing in particular a rigid connection of the shovel with the handle in various positions. The said means consist in providing on the shovel a carrier plate for a spindle parallel with the plane of the shovel and a notched rib perpendicular to said plane, while the end of the handle is formed with two pivotally connected elements pivoting with reference to each other and carrying a hook-forming claw constituted by two semi-cylindrical elements adapted to be mounted on said spindle and a tenon movable with an element of the pivotally connected handle and adapted to engage a notch of said rib.

In the inoperative position, i.e., the protection or transportation position, the shovel is placed in contact with the handle and is made rigid therewith. The claw on the handle being engaged over the spindle on the shovel and the tenon being in the notch corresponding to said position, the elements of the handle are connected and locked by a suitable connecting member provided at the other end of the handle. If the two previously released elements are spaced away from each other by an angle such that the tenon releases the notch in the rib of the carrying plate in which it was engaged, the handle will pivot freely around the axis of the shovel. After rotation through 90°, the tenon then engages another notch of the rib and the elements of the handle are again interconnected and locked. The shovel in said position perpendicular to the handle may then be used as a shoe. Through a rotation of 180° obtained under the same conditions, the shovel lies in alignment with the tool and serves as a spade. A mere rotation by 180° in the opposite direction brings the handle into its original position in contact with the shovel for transportation purposes.

It is an easy and speedy matter, even in the dark or at night to set up the shovel through mere feeling and without dismantling it into different positions just by rocking it around its axis. If, as mentioned, the handle carries other implements such as an axe, a pick, shears or a saw to allow the latter to be used individually and as without the shovel, it is sufficient to disengage the handle with reference to the shovel during the time required for said use.

The novel features characterizing the subject invention will be pointed out in conjunction with the ensuing detailed description, having reference to the accompanying drawings, wherein:

FIG. 1 is a side elevation view of the tool with the shovel in operative position, acting as a hoe;

FIG. 2 is a longitudinal sectional view of the tool with the shovel extending in substantial alignment with the handle for which position it serves as a spade, while FIG. 3 is a view at right angles with reference to FIG. 2 of the tool in the same position;

FIG. 4 is a perspective elevation view of the ends of the handle elements, when joined;

FIG. 5 shows the same elements spread apart;

The drawings show a handle including two elements 3 and 6 have a semi-circular transverse preferably hollow pivot 7 held by a counter plate 9 riveted to element 3.

Axe I and pick 2 are secured in any suitable manner, to said handle through an end-piece which is not illustrated. A suitably outlined section of the inner edge of the surface constituted by the axe and pick cooperates with a cutting section 5 rigid with the handle element 6, so as to form shear jaws. Advantageously, the elements 3 and 6 have a semi circular transverse preferably hollow cross section, so as to reduce their weight and they are shaped in a manner such that, when juxtaposed, they form a cylindrical system of a circular cross section constituting the handle.

To the end of the handle element 6 is secured an end-piece 10 of a semi-circular cross section secured to the handle in any suitable manner and ending outside said handle in the shape of a socket 11 outwardly threaded approximately to the same diameter as the thread on the tool handle, so as to be engaged by a tapped ring 12. The arrangement is such that when the ring is screwed over the socket, it covers the free end of the handle element 3 and connects positively the handle element 3 with the handle element 6.

The operation of the tool when serving as shears may now be briefly explained. It is sufficient to release the handle element 6 to unscrew the ring 12, the latter being advantageously mounted in a manner such that it remains permanently on the socket 11 and does not risk being lost. To the end of the pick and axe member, rigid with the handle element 3, is secured a claw constituted by two hook-shaped parts 8 parallel with each other, having a semi-circular cross section, while the movable section of the shears rigid with the above mentioned handle element 6 carries a flat tongue 13 adapted to move angularly around the pivot with said element, the part played by which will be disclosed hereinafter.

The shovel element 14 is shaped and ribbed as required for tools of this type. It is provided in its rear section 15 with a carrier plate 16 riveted, for instance, or welded or secured through any other means and provided with two flat parallel flanges extending perpendicularly to the securing plane, the central rib 17 being notched and lying in the plane of symmetry of the shovel, while the two other ribs 18, lying to either side of the central rib and at equal distances therefrom, carry a spindle 19; the central rib 17 is transversely shaped, so as to show approximately the outline of a quarter of a circle, the center of which registers with the axis of the spindle 19. Said central rib is provided with notches, such as 20, two of which are positioned in parallelism with the plane of the shovel and a third notch is perpendicular to said plane.

The operation of the device is obtained upon engagement of the two semi-circular hooks on the claw 8 with the sections of the spindle 19 lying between the ribs 18, to either side of the central notched rib 17. Thus, the tool may rotate around the shovel in either direction by 180°.

When a notch of the ribs registers with the tongue 13 upon rotation of the handle element 3 round the pivot 7, said tongue may be engaged inside said notch so as to lock the two cooperating parts in the position defined by selection of the notch on the medial rib. If the tongue is positioned on the handle in a manner such that it engages a notch when the two handle elements 3 and 6 are assembled, it is sufficient to screw the threaded ring 12 on the socket 11 to hold fast in position the handle element 3, and, consequently, the tongue 13.

When the tool is to be used as a spade, i.e., for toe position illustrated in FIGS. 2 and 3, the shovel is substantially in alignment with the handle elements 3 and 6. To change the position of this shovel, and make it assume the position illustrated in FIG. I, it is sufficient to unscrew the ring 12, so as to release the moveable handle element 6. Upon spacing the handle element 6 by a sufficient angle with reference to the handle element 3, the tongue 13 is shifted away from the notch engaged by it. The two handle elements being thus in their open position, the shovel may rock round its pivotal axis constituted by the claw 8. By selecting the medial notch upon rotation by 90° and by inserting the tongue inside said notch and locking the tool, there is obtained a hoe which may be used as such. If the shovel has been rocked through 180° in the same direction, the shovel would assume a position opposed to that illustrated in FIG. 2 and for which the shovel lies in contact with the pick and axe member, i.e., in the transportation position. There is provided on the handle element 3, a stationary stop 21 while a collapsible stop 22 held by the counter plate 9 is designed so as to enter a position for which upon abutment against the stationary stop rigid with the handle element 3, it limits the angular shifting of the handle element 6 to a position beyond that corresponding to the operation of the tool as shears. This cuts out any possible pinching of the operator's hand when the two handle elements of the tool operating as shears are brought near each other during a cutting operation.

I do not wish to be limited either as to the particular details of construction or as to the size of the unit, the only intended limitations being those clearly indicated by the express terms of the appended claims.

I claim:

1. A portable tool comprising: a shovel and a handle; a first pivot connection joining said shovel to one end of said handle so that the latter assumes different angular positions relative to the former; means for locking said shovel and handle in each of such positions; said handle being formed of two elements; a second pivot connection, adjacent to, and normal to said first connection, joining said two elements; said first pivot connection comprising a pivoting spindle supported on said shovel in parallel relationship therewith and securing hooks integral with one of said handle elements and receiving said spindle; said locking means including an upright plate fixed to said shovel and said pivoting spindle; notches on the periphery of said plate; a projecting tongue on the other of said handle element adapted to enter one of said notches when said elements are in juxtaposed position to lock said shovel and said handle in predetermined angular position.

2. A portable tool as in claim 1, wherein there are three notches provided on said plate; two of which are parallel, to and one normal to, said shovel so that the latter may hold in line, parallel and normal position relative to said handle.

3. A portable tool as in claim 1, wherein said handle elements are held in juxtaposed relationship by means of a sleeve screw-threadedly mounted on one element and engageable in over-lapping relationship with the other element upon complete engagement with said element.

References Cited in the file of this patent
FOREIGN PATENTS

| | | |
|---|---|---|
| 951,560 | Germany | Oct. 31, 1956 |
| 55,721 | Austria | Oct. 10, 1913 |
| 1,141,906 | France | Mar. 25, 1957 |
| 1,170,809 | France | Sept. 29, 1958 |
| 746,689 | Great Britain | Mar. 21, 1956 |